United States Patent [19]

Berger

[11] Patent Number: 5,524,675
[45] Date of Patent: Jun. 11, 1996

[54] PIG SAFETY DEVICE

[76] Inventor: Martin H. Berger, 15624 92nd Avenue, Edmonton, Alberta, Canada, T5R 5C4

[21] Appl. No.: 252,904

[22] Filed: Jun. 2, 1994

[30] Foreign Application Priority Data

Jun. 8, 1993 [CA] Canada .................... 2097939

[51] Int. Cl.$^6$ .................................................. F16L 9/00
[52] U.S. Cl. .............................. 138/178; 138/89; 138/97; 138/109
[58] Field of Search ........................ 138/178, 177, 138/109, 89, 97; 73/864.75; 285/23, 35, 320; 15/104.061; 134/168 C, 167 C, 201

[56] References Cited

U.S. PATENT DOCUMENTS

| | | | |
|---|---|---|---|
| 3,292,197 | 12/1966 | Stephens | 15/104.06 |
| 4,077,435 | 3/1978 | Van Scoy | 138/89 X |
| 4,237,936 | 12/1980 | Lollis et al. | 138/90 |
| 4,345,350 | 8/1982 | Burd | 15/104.06 |
| 4,543,131 | 9/1985 | Purinton, Jr. | 134/8 |
| 4,569,539 | 2/1986 | Creedon | 285/18 |
| 5,339,846 | 8/1994 | Shelton et al. | 134/167 C X |

*Primary Examiner*—Timothy F. Simone
*Assistant Examiner*—Patrick F. Brinson
*Attorney, Agent, or Firm*—Workman, Nydegger & Seeley

[57] ABSTRACT

A safety device for automatically preventing an injectile propelled within a pipeline having a terminus from inadvertently escaping the pipeline at a coupling point. The safety device automatically engages upon decoupling, thereby safe-guarding the pipeline operator and surrounding area from injury and/or damage due to injectiles that have been previously injected within or passed through the pipeline and that could otherwise inadvertently escape the pipeline upon decoupling. A preferred embodiment of the present invention comprises a base, means for clamping and means for automatically halting the progress of the injectile. One embodiment of the present invention further comprises means for horizontally positioning the means for automatically halting the progress of the injectile, means for vertically positioning the means for automatically halting the progress of the injectile and means for displacing the means for automatically halting the progress of the injectile. The claimed invention also contemplates a means for situating the base on a pipeline terminus such that the base is in the optimal position with respect to the coupling point.

31 Claims, 9 Drawing Sheets

PIG SAFETY DEVICE

BACKGROUND

1. Field of the Invention

The present invention relates generally to a safety device for preventing injectiles propelled within a pipeline from inadvertently escaping the pipeline. More specifically, the present invention relates to a safety device for use with a coupler which prevents an injectile propelled within a pipeline from inadvertently escaping the pipeline at a coupling point removably attaching two sections of pipe. The present invention automatically engages when two sections of pipe are decoupled, thereby safe-guarding the pipeline operator and surrounding area from injury and/or damage due to injectiles that have been previously injected within or passed through a pipeline from inadvertently escaping the pipeline upon decoupling.

2. Background Art

In many areas of modern industry there is an urgent need for a safety device to prevent pipeline operators and the surrounding area from being injured or damaged, respectively, from injectiles that inadvertently escape the pipeline. This need is especially urgent, for example, where devices known as pigs are injected within and propelled through a pipeline. If a pig inadvertently escapes a pipeline, the previously injected mass is projected from the pipeline at a relatively high velocity and may injure any person or object within the pig's trajectory path.

A multitude of injuries occur every year to pipeline operators who mistakenly separate and/or decouple lengths of pipe without first making the proper adjustments to relieve all pressure or other propelling force acting on the pig and thus allows the pig to be projected from the pipeline. Because the pipeline operator stands in relative proximity to the coupling and/or separation point, it is often the pipeline operator who is severely injured. However, due to the velocity with which a pig may be propelled, upon inadvertent release, a pig could project into the area surrounding the coupling point and injure bystanders or damage other material.

A. Pigs

Generally, pigs are bullet-shaped devices that are passed or propelled through a pipeline for a multitude of uses. Pigs are generally known in the prior art and are often either mechanical or chemical. Mechanical pigs normally have wire brushes or abrasive surfaces to physically abrade the scale interior of the pipe. Chemical or gelled pigs are normally chemically based devices that have the ability to conform to the interior shape of the pipeline. Thus, a tight seal can be formed so that material before the pig can be separated from material behind the pig. The separation process permits manufacturers to quickly change fluids within the pipeline without the fear of mixing or interchanging the chemical components of the fluids.

For example, U.S. Pat. No. 4,345,350 issued Aug. 24, 1982, to Burd titled "Pipeline Cleaning Equipment," incorporated herein by reference, discloses a mechanical pig for removing ferromagnetic debris from the internal surface of pipelines. Mechanical pigs, have a variety of uses in connection with the operation of pipelines used for the transport of fluids such as natural gas or oil. They may be used for inspecting the internal surfaces of the pipeline and, for this purpose, carry a variety of test equipment such as polarizing magnets and magnetic field sensors, ultrasonic probes, contact styli or the like.

Still, another form of mechanical pigs serves to clean the pipeline and for this purpose carry brushes and scrapers to remove or loosen scale or other debris from the pipeline surfaces they pass through.

Alternatively, U.S. Pat. No. 4,543,131, issued Sep. 24, 1985, to Purinton Jr., titled "Aqueous Crosslinked Gel Pigs For Cleaning Pipelines," incorporated herein by reference, discloses a chemical or gelled pig containing an aqueous, crosslinked gelled galactomannan gum, or derivative thereof. Such a pig is also used primarily for cleaning the interior of pipelines. Gelled or chemical pigs remove the surface deposits by dissolution and/or by picking up loose debris as they pass through the pipeline. Such pigs can be either passed through the pipeline alone or may be used in pig trains containing one or more chemical pig segments in the train. Other gelled chemical pigs contain bactericides to remove bacteria-containing scale from pipelines.

An advantage of chemical or gelled pigs is that such devices are able to create a tight chemical seal in the pipeline, allowing one to clean the pipelines which are filled with liquid without first evacuating the lines. Passing the gelled pigs with the tight chemical seal, then, displaces the liquid contents of the pipeline ahead of the pig or the pig train, without contamination of materials behind the leading chemical or gelled pig.

In order for pigs to function properly they must be passed through or injected within a pipeline. Some means or force is utilized to propel the pig from one end of a pipeline to the other. Generally, this involves placing greater fluid or air pressure behind the pig than in front of it. After cleaning and/or separation has occurred, procedures are devised to limit the pig's propulsion force so that the pig can be removed from the pipeline safely. However, human error may cause a mistake in the necessary order of the procedures followed or in the manner the propulsion is decreased. Thus, when a pipeline operator attempts to remove the pig from the pipeline the pig may be inadvertently propelled from the pipeline and ultimately injure the pipeline operator or damage other material in the surrounding area.

B. Pipe Union Assemblies

In many areas of modern industry, pigs are removed from the pipeline at a coupling point, i.e., the point at which two pipes are joined by a pipe union assembly. An example of a pipe union assembly is disclosed in Canadian Patent No. 1,303,094 issued Jun. 9, 1992, to Chapmen, et al., titled "Pipe Union Assembly," incorporated herein by reference.

The pipe union assembly disclosed in Canadian Patent No. 1,303,094 relates generally to fitting and couplers for use with pipes and hoses. More particularly the invention disclosed in such patent relates to pipe union assemblies which allow two pipes to be selectively joined together in, and released from, a sealant engagement such that the sealant engagement is maintained under extreme pressure and/or temperature conditions.

Such invention satisfies the urgent need in modern industry for devices which allow two pipes to be repeatedly joined together while allowing for easy separation of the pipes. This need is especially urgent where the substances carried by the pipes are under extreme pressure and/or temperature conditions. The chemical, cryogenic, petroleum and food processing fields are just some examples of the industries having such needs.

The various coupling devices found in the prior art may be called connectors, fittings, unions, couplings, joints, or some other name, but they all serve the same function of joining two pipes.

The pipe union assembly disclosed in Canadian Patent No. 1,303,094 generally comprises at least one hollow-fitting member which may be attached at a first end to a pipe, and a sealing member which may (in at least one embodiment) be attached at a first end to another pipe. Each fitting member is provided with a tapered ridge running parametrically around the end of the fitting member so as to extend axially therefrom. The sealing member is provided with at least one parametric, tapered channel configured in a shape which compliments the shape of the tapered ridge. To provide a sealing engagement between a fitting member and the sealing member, the fitting member tapered ridge is inserted into the sealing member tapered channel.

The planar contact between the sides of the tapered ridge and the walls of the ridge and sealing member channel form a fluid-tight seal. The taper, or angle, of both the fitting member ridge sides and the sealing member channel walls are chosen so as to form the most secure seal possible.

Canadian Patent No. 1,303,094 provides for multiple embodiments of its claimed invention. For example, Canadian Patent No. 1,303,094 discloses one preferred embodiment providing for a restricting means to ensure that the union may be disassembled safely even when residual pressure remains in the system. Such a pipe union assembly is often used in the same industries employing pigs for cleaning and/or separating fluids within a pipeline.

In one embodiment of the invention disclosed in Canadian Patent No. 1,303,094 the union may be disassembled safely, even though residual pressure remains in the system. However, if a pipeline operator disassembles the pipe union assembly with a pressurized pig within the pipeline and fails to previously release the residual pressure in the system, the pipeline operator could be severely injured as the disassembling of the pipe union assembly lowers the pressure at the assembly or coupling point, thereby allowing the pig to inadvertently escape from the pipeline at an injurious momentum.

C. Pig Traps

In an effort to overcome some of the above-mentioned difficulties, pig trap devices have been suggested for use at the end of a pipeline. Generally, such traps are used to insert pigs into or withdraw pigs from a pipeline. Typically, these traps are closed at one end by a solid door or cap to prevent communication between the interior of the pipeline and the atmosphere. When a pig is to be inserted, the door is opened, the pig is inserted and the door is closed for launching the pig into the pipeline. To withdraw the pig from the pipeline, the pig runs into a pipe of the trap, the door is opened and the pig is removed. However, the solid nature of the door or cap precludes an operator from viewing the contents of the pig trap before opening the door.

Pig traps usually include a collar adapted to be attached to the end of a pipe, a door for opening and closing the end of the pipe, means for clamping the door to the collar and sealing means for preventing communication between the interior of the pipe and the atmosphere when the door is clamped to the collar. Each of the different mechanical components comprising a pig trap increases the cost to make pig traps.

Much of the increased need for additional mechanical components of a pig trap lies in the need for the pig trap to remain sealed. Thus, means must be incorporated to seal the collar to the pipe and the door to the collar. Further, certain pig trap devices disclose a testing valve for indicating to the pipeline operator the presence of pressure and fluid in the pipe. However, as previously stated, because the operator is unable to view the interior of the pig trap, there is no possible way to ascertain whether the testing valve is properly reading the pressure inside the pig trap. An operator error in reading the test valve or a mechanical error in the test valve itself could prove fatal to the pipeline operator or any other individual within the surrounding area.

Thus, use of pig traps have several disadvantages. First, pig traps are limited to being clamped at one end of a pipeline.

Second, pig traps cannot be placed at various points along a pipeline, increasing the flexibility for adjusting, moving or changing the length of a pipeline.

Third, pig traps often restrict a pipeline operator's view when trying to determine the presence of a pig that has been released into the system.

Fourth, in order to extend the pipeline, a pig trap will need to be removed from the end of a pipeline prior to attaching the extension.

Fifth, the type of pig trap utilizing a testing valve for indicating the presence of pressurized fluids in the pig trap adds an additional component that is subject to error. For example, a pipeline operator may assume based on a testing valve reading that no pressurized fluids are present in the pipeline. However, the testing valve may be broken and upon opening the trap door pressurized fluids could escape and severely injure the pipeline operator or damage the surrounding area. Additionally, the pipeline operator could simply misread the testing valve, ultimately producing the same injurious effect.

Sixth, pig trap devices typically include multiple mechanical features such as a door, a collar, latches and sealing means, all of which increase the manufacturing cost and ultimate selling price of any pig trap incorporating them.

Seventh, pig traps are sealed devices and retain oil or other fluids expelled from the pipeline.

Thus, requiring further steps to remove trapped fluids.

In view of the foregoing, it would be an advancement in the art to provide a safety device which is not limited to being clamped at one end of a pipeline.

Yet another advancement would be to provide a safety device that can be placed at various points along a pipeline to increase the flexibility of adjusting, moving and/or changing lengths of a pipeline.

Yet another advancement would be to provide a safety device that does not restrict a pipeline operator's view when trying to determine the presence of an injectile that has been released into a pipeline system.

Yet another advancement would be to provide a safety device that does not require removal from the pipeline prior to extending the length thereof.

Yet another advancement would be to provide a safety device that does not necessitate a testing valve that is potentially subject to mechanical or human error to indicate the presence of pressurized fluids in the pipeline.

Yet another advancement would be to provide a safety device which has relatively few working parts and therefore inexpensive to manufacture; resulting in a reduction of the selling price to the ultimate user.

Yet another advancement would be to provide a safety device which channels or deflects oil or other fluids away from the pipeline operator.

BRIEF SUMMARY AND OBJECTS OF THE INVENTION

Accordingly, it is an object of the present invention to provide a safety device which is not limited to being clamped at one end of a pipeline.

It is also an object of the present invention to provide a safety device that can be placed at various points along the pipeline to increase the flexibility of adjusting, moving and/or changing lengths of the pipeline.

It is still another object of the present invention to provide a safety device that does not restrict a pipeline operator's view when trying to determine the presence of an injectile that has been released into a pipeline system.

Yet another object of the present invention is to provide a safety device that does not require removal from the pipeline prior to extending the length thereof.

Another object of the present invention is to provide a safety device that does not necessitate a testing valve that is potentially subject to human and/or mechanical error to indicate the presence of pressurized fluids in the pipeline.

Additionally, another object of the present invention is to provide a safety device which has relatively few working parts and therefore inexpensive to manufacture; resulting in a reduction of the selling price to the ultimate user.

Additional objects and advantages of the invention will be set forth in the description which follows, and in part will be apparent from the description or may be learned by the practice of the invention. The objects and advantages of the invention may be realized and obtained by means of the instruments and combinations particularly pointed out in the appended claims.

To achieve the foregoing objects, in accordance with the invention as embodied and broadly described herein, a safety device is provided for use with a coupler which prevents an injectile propelled within a pipeline from inadvertently escaping the pipeline at a coupling point at which the pipeline can be separated into at least first and second pipe members. The safety device comprises a base positioned at a location near the coupling point. The device further comprises means for clamping the base to the pipeline terminus and means for automatically halting the progress of the injectile from inadvertently escaping the pipeline at the coupling point, which means for automatically halting the progress of the injectile automatically engages when the pipeline is decoupled at the coupling point. The means for clamping the base to the pipeline terminus, by way of example but not limitation, comprises a clamping arm, a bolt passing through the clamping arm and a hole formed in the top of the base cooperating with the a bolt. The means for automatically halting the progress of the injectile, by way of example and not limitation, comprises an arm having a first end and a second end, the arm being rotatably attached to the base at the first end and a shield integral with and depending from the arm at the second end.

A further embodiment of the present invention contemplates providing means for displacing the means for automatically halting the progress of the injectile to allow the first pipe member to be coupled with the second pipe member. By way of example and not limitation, the means for displacing the means for automatically halting the progress of the injectile comprises a flange depending from and integral with the means for automatically halting the progress of the injectile. The means for displacing the means for halting the progress of the injectile allows the user to efficiently and easily displace the means for automatically halting the injectile away from its natural position of rest, which is substantially perpendicular to the base. By displacing the means for automatically halting the progress of the injectile, the user may easily couple another section of pipeline to the pipeline whereon the safety device is clamped.

Another preferred embodiment of the present invention contemplates using the present invention in connection with a pipe union assembly. This embodiment contemplates a safety device comprising a hollow fitting member having a first end and a second end, means for attaching the hollow fitting member of the first end thereof to the first pipe member, an annular tapered ridge extending from the second end of the hollow fitting member, a hollow rigid sealing member having a first end and a second end and means for attaching the hollow rigid sealing member at the first end thereof to the second pipe member. The device further comprises an annular tapered channel configured to compliment the shape of the annular tapered ridge and to sealingly engage the annular tapered ridge of the hollow fitting member such that the hollow rigid sealing member substantially retains its original configuration when the annular tapered channel receives the annular tapered ridge. The base of the safety device is then disposed on the pipeline terminus and a means for clamping the base to the pipeline terminus and a means for automatically halting the progress of the injectile to prevent the injectile from inadvertently escaping the hollow fitting member of the coupling point, which means for automatically halting the progress of the injectile automatically engages when the pipeline is decoupled at the coupling point, is further provided.

Still, another preferred embodiment contemplates a safety device wherein the base is integral with the first end of the hollow fitting member. Therefore no clamping means is necessary.

The claimed invention also contemplates a method for preventing an injectile propelled within a pipeline from inadvertently escaping the pipeline at a coupling point. The method comprises the steps of positioning a base at a location near the coupling point, the base having an arm rotatably attached to the base at the first end thereof and integrally attached to a shield depending therefrom at a second end. The base is then clamped to a bracing arm positioned opposite the base on the pipeline terminus, thereby securing the base to the pipeline terminus. The shield is positioned to impose on the coupling point and the pipeline is separated at the coupling point thereby initiating the rotational motion of the arm and the shield.

The claimed invention contemplates other methods for preventing an injectile propelled within a pipeline from inadvertently escaping the pipeline at the coupling point wherein the base is positioned in connection with a pipe union assembly. Specifically, the base is positioned at a location near the coupling point and the base has an arm rotatably attached to the base at a first end and integrally attached to a shield depending therefrom at a second end. The base is then clamped to a bracing arm positioned opposite the base on the pipeline terminus, thereby securing the base to the pipeline terminus and the shield is positioned to impose on a two piece pipe union assembly that comprises a hollow fitting member and a hollow rigid sealing member. The two piece pipe union assembly is then separated at the coupling point by removing the hollow fitting member from the hollow rigid sealing member, thereby initiating the rotational motion of the arm and the shield.

Another method is also contemplated by the claimed invention wherein no step of clamping the base to the pipe union assembly is necessary. This method contemplates a base integral with the first end of the hollow fitting member. Means are employed to attach the hollow fitting member at the first end to the first pipe member and means are also employed to attach the hollow rigid sealing member at the first end thereof to the second pipe member. The pipeline is then coupled by coupling the hollow fitting member at the second end to the second end of the hollow rigid sealing member and the shield is positioned so as to impose on the two piece pipe union assembly. At the appropriate time, the two piece pipe union assembly is disassembled and/or separated at the coupling point to allow the pipeline to be separated. This is accomplished by removing the hollow fitting member from the hollow rigid sealing member, thereby initiated the rotational motion of the arm and the shield. Such an action automatically engages the shield and automatically places the shield in a position substantially perpendicular to the base; thereby blocking the opening to the pipeline so that any injectile that would naturally escape the pipeline would be prevented from doing so.

BRIEF DESCRIPTION OF THE DRAWINGS

In order that the manner in which the above-recited and other advantages and objects of the invention may be better understood, a more particular description of the invention briefly described above will be rendered by reference to specific embodiments thereof which are illustrated in the appended drawings and which constitute the best mode presently contemplated with respect to the invention.

Understanding that these drawings depict only typical embodiments of the invention and are not, therefore, to be considered limiting of its scope, the invention will be described with additional specificity and detail through the use of the accompanying drawings in which.

DETAILED DESCRIPTION OF THE PREFERRED EMBODIMENTS

Figure 1:
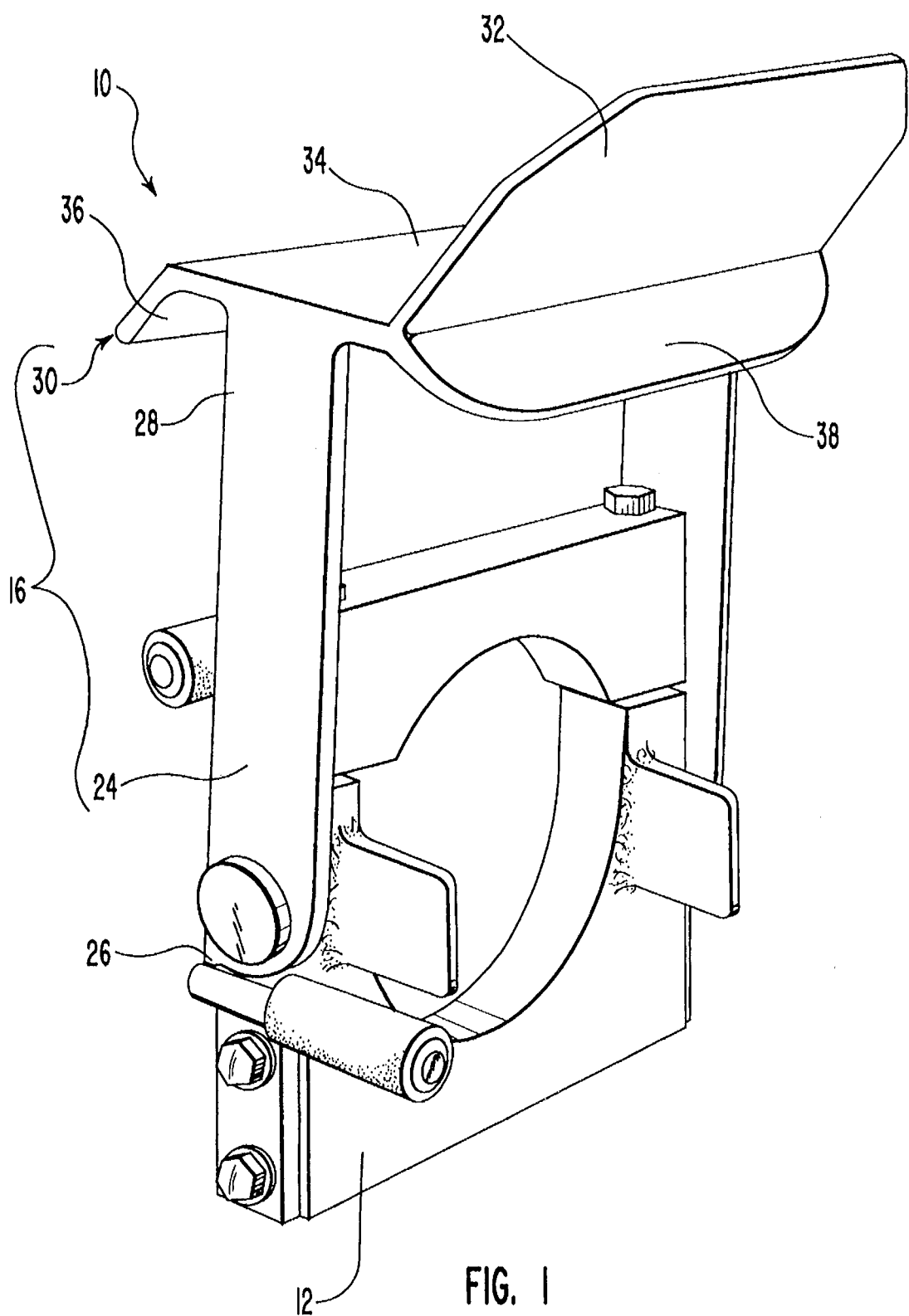
FIG. 1 is a perspective view of a preferred embodiment of the present invention.

FIG. 1 presents a presently preferred embodiment of a safety device, designated generally by the reference numeral 10, useful for preventing an injectile propelled within a pipeline from inadvertently escaping the pipeline at a coupling point. As used herein, the term "pipeline" and/or "pipe" is meant to include a pipe, tube, hose or any other hollow device for which an injectile is or may be passed through or propelled. Moreover, the term injectile includes not only pigs (discussed above), but any body or mass passed through or within a pipeline.

Figure 2:
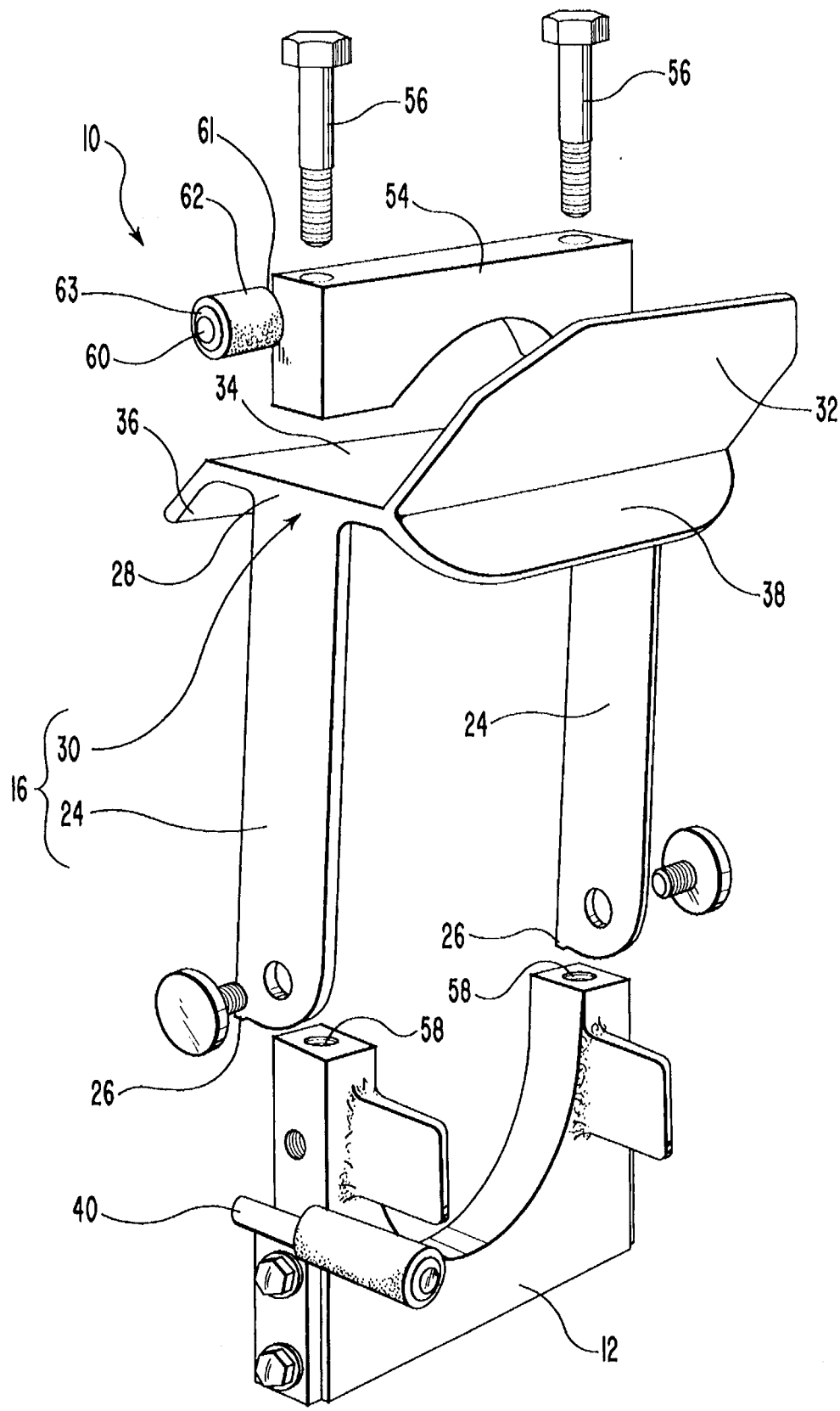
FIG. 2 is an exploded view of the embodiment in FIG. 1.
Figure 3:
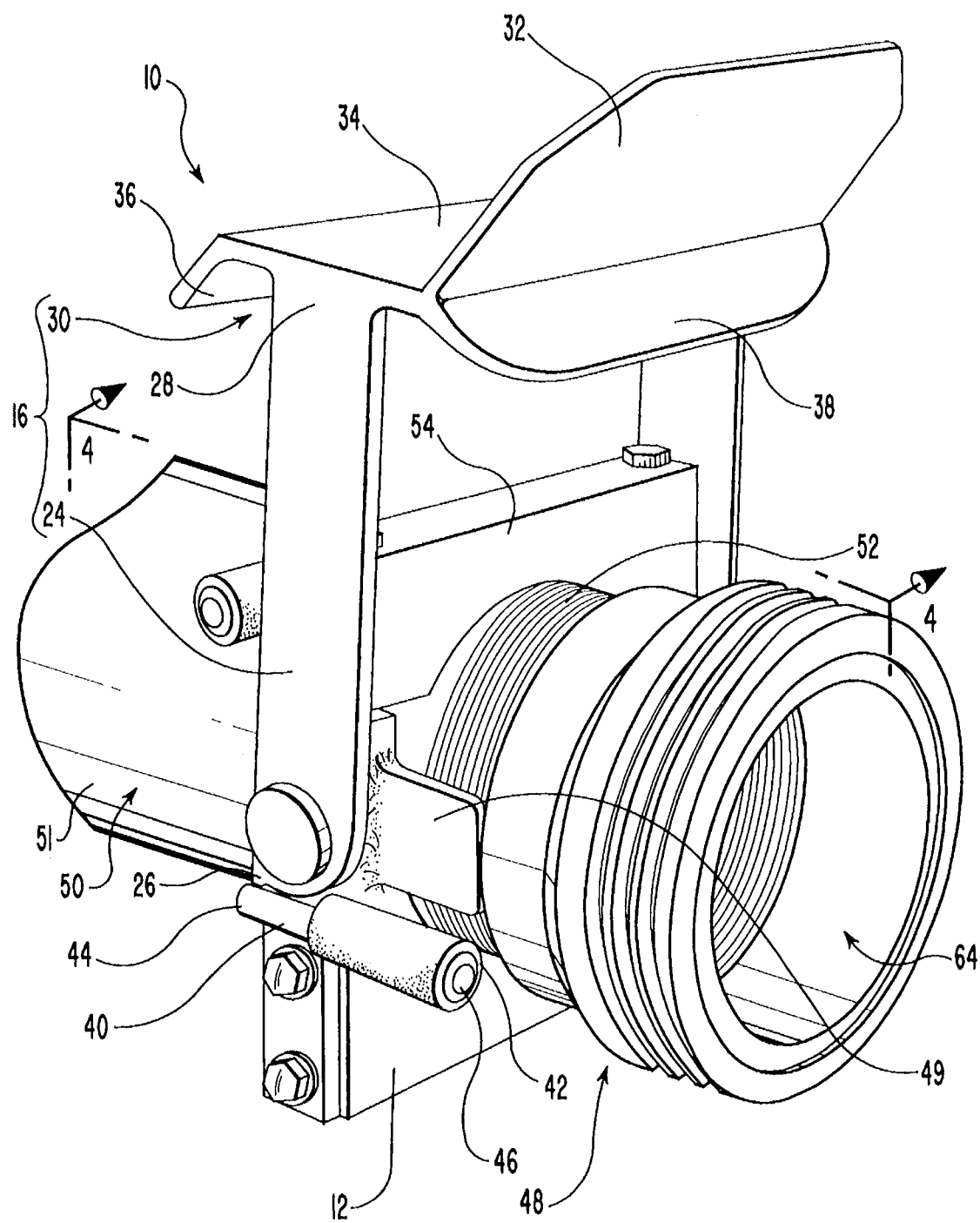
FIG. 3 is a perspective view of one embodiment of the invention used in connection with a pipeline.

Safety device 10 comprises a base 12 and means for clamping the base to the pipeline terminus, the pipeline terminus if designated generally by the reference numeral 50 in FIG. 3. Means for clamping, shown in FIG. 2, by way of example and not limitation, comprises clamping arm 54, bolt 56 passing through clamping arm 54 and hole 58 formed in the top of base 12 cooperating with bolt 56. In a presently preferred embodiment, clamping arm 54 and base 12 are formed so as to conform to the external shape of pipeline terminus 50. Base 12 and clamping arm 54, however, could also be formed so as not to conform with the shape of pipeline terminus 50 so long as safety device 10 would be sufficiently secured.

As used herein, "pipeline terminus" is meant to include a terminal end of pipe and/or pipeline as well as a terminal end of a coupling, pipe union assembly or any other structure sufficiently near a coupling point to which safety device 10 could be secured. For example, a hollow fitting member secured to a pipeline could have a longitudinally extending portion between the coupling point and the end of a pipeline. In this instance, safety device 10 would be secured to the longitudinally extending portion of the hollow fitting member, which is considered to be covered by the term pipeline terminus.

Other mechanisms may be employed for clamping base 12 to pipeline terminus 50. For example, clamping arm 54 could be hingedly attached to base 12 at one end and latched to base 12 at the other end. Alternatively, base 12 could be latched at each end to both ends of clamping arm 54. Regardless of the specific method used to secure base 12 to pipeline terminus 50, the securing mechanism will need to sufficiently fix base 12 to pipeline terminus 50 so that base 12 is not remotely displaced when safety device 10 halts the progress of an injectile.

Safety device 10 further comprises means for automatically halting the progress of the injectile, shown in FIG. 1, by way of example and not limitation, as pig stop 16. Pig stop 16 comprises arm 24 and a shield, designated generally as reference numeral 30. Arm 24 has a first end 26 and a second end 28 and is rotatably attached to base 12 at first end 26. Shield 30 is formed so as to be integral with arm 24 and depends from arm 24 at second end 28.

A presently preferred embodiment of the present invention contemplates shield 30 formed so as to be substantially u-shaped. (See FIG. 1) As used herein, the term "u-shaped" is intended to include any structure substantially forming part of the portional sides of a u, sufficient to channel or deflect fluids passing through the pipeline away from the pipeline operator when shield 30 is engaged. Shield 30 is comprised of a substantially planar shield bottom 34 and first shield side 36 and second shield side 38. First shield side 36 and second shield side 38 are integral with shield bottom 34 and are placed at an obtuse angle with respect to the plane of shield bottom 34.

Shield 30 can be shaped in a multitude of fashions as long as shield 30 sufficiently halts the progress of an injectile within a pipeline when the injectile comes in contact with shield 30. Thus, by way of example and not limitation, shield 30 could be substantially nonplanar and curved in nature or shield 30 could be of rectangular shape with flanges placed at angles sufficient to prevent the injectile from inadvertently escaping the pipeline at the coupling point. It is also desirable to have flanges placed at angles sufficient to channel or deflect fluids passing through the pipeline away from the pipeline operator when shield 30 is engaged.

When the pipeline is coupled, pigstop 16 rests on the coupling point. In this manner, the pipeline is sufficiently sealed so that the injectile may be passed within or through the pipeline. When the injectile has passed through a sufficient portion of the pipeline and before it passes the coupling point, at which point safety device 10 is secured, the force propelling the injectile through the pipeline is optimally terminated. The pipeline may then be decoupled at the coupling point. Upon decoupling, residual force may continue to propel the injectile toward the coupling point. However, also upon decoupling, pigstop 16 automatically engages in rotatable motion until shield 30 is positioned to bar the path of the injectile and prevent the injectile from escaping the pipeline at the coupling point. The function and use of safety device 10 in connection with pipelines and pigs by reference to drawings will be discussed in more detail after there has occurred a more complete discussion of other embodiments of the present invention.

One embodiment of the present invention further comprises means for horizontally positioning the means for automatically halting the progress of the injectile, shown in FIG. 3, by way of example and not limitation, as rod 40 having a first end 44 and a second end 46. Rod 40 is secured at first end 44 to base 12. Cushioning material 42 can cover second end 46 to dampen the impact of arm 24 when arm 24 is automatically placed in rotatable motion. Rod 40 also serves to substantially perpendicularly align pigstop 16 with the plane formed by base 12. In this manner, pigstop 16 is placed in the optimal position with respect to pipeline opening 64 to halt the progress of the injectile within the pipeline.

Another embodiment of the present invention may further comprise means for vertically positioning the means for automatically halting the progress of the injectile such that the means for automatically halting the progress of the injectile is precluded from obtaining a perfect vertical position. The means for vertically positioning the means for automatically halting the progress of the injectile is shown in FIG. 2, by way of example and not limitation, as rod 60 having a first end 61 and a second end 63. Rod 60 is secured to clamping arm 54 at first end 61 and second end 63 and is covered by cushioning material 62 to dampen any impact of arm 24 when arm 24 is displaced vertically to permit the pipeline operator to couple or decouple the pipeline at the coupling point.

Rod 60 is situated so that pigstop 16 is precluded from obtaining both a perfect vertical position and ultimately resting in equilibrium at vertical. Since pigstop 16 is precluded from resting in equilibrium at vertical, pigstop 16 will automatically seek the lowest unimpeded position, whether it is resting on the coupling point or seeking a position aligned so as to halt the injectile's progress.

Other structures that are also contemplated and equivalent to rod 60 include, by way of example and not limitation, a protruding portion of arm 24 extending from first end 26 to impinge on rod 40 and preclude pigstop 16 from reaching a perfect vertical position. Likewise, flanges extending from base 12 and/or arm 24 could also be provided to restrict the vertical position of pigstop 16, as could restricting the rotatable motion of arm 24 mechanically where arm 24 is rotatably attached to base 12.

Still, another embodiment of the present invention may further comprise means for displacing the means for automatically halting the progress of the injectile, shown in FIG. 3, by way of example and not limitation, as flange 32 depending from and integral with shield 30. In such embodiment, flange 32 is situated so as to be extending from shield bottom 34 and is integral with shield bottom 34 on the line joining shield bottom 34 to second shield side 38. Further, flange 32 is placed so as to be at an angle of opposite direction from second shield side 38, relative to the plane of shield bottom 34.

By placing flange 32 at an angle of opposite direction from second shield side 38, a pipeline operator can quickly displace pigstop 16 so that one end of a pipeline can be joined to another by use of a coupler or in some other manner. Thus, flange 32 is ergonomically positioned so that a pipeline operator need not exclusively dedicate one hand to displacing pigstop 16. The pipeline operator, then, can use both hands to manipulate the engaging coupling or pipe. Further, a pipeline operator can approach the coupling point carrying the pipeline to be joined with both hands and lift pigstop 16 by positioning a force, usually the operator's knuckles, wrist or upper hand, so as to vertically lift flange 32. Upon applying the lifting force to flange 32, the pipeline operator can easily and quickly place one end of a first pipe member adjacent to the end of a second pipe member and join the two members into a single pipeline.

FIG. 3 further presents an embodiment of the present invention wherein the present invention is clamped to pipeline terminus 50. Coupler 48 is threaded on the end of pipeline terminus 50 by use of interconnecting threads 52. In this manner any pipeline operator may fully thread coupler 48 to the fullest extent necessary in order to obtain a tight seal between coupler 48 and pipeline 51. Safety device 10 is then disposed on pipeline terminus 50 by placing base 12 on the bottom of pipeline terminus 50 and securing safety device 10 to pipeline terminus 50 by use of clamping arm 54. Base 12 can also be placed on the top of pipeline terminus 50 as long as a force, by way of example and not limitation, such as a spring, is provided to thrust pigstop 16 toward a position substantially perpendicular to the plane formed by base 12.

One embodiment of the present invention provides for means for situating base 12 on pipeline terminus 50 such that base 12 is in the optimal position with respect to the coupling point. As shown in FIG. 3, by way of example and not limitation, means for situating base 12 on pipeline terminus 50 may comprise flange 49 formed so as to be integral with base 12 and extending substantially normal to the plane formed by base 12.

Figure 4:
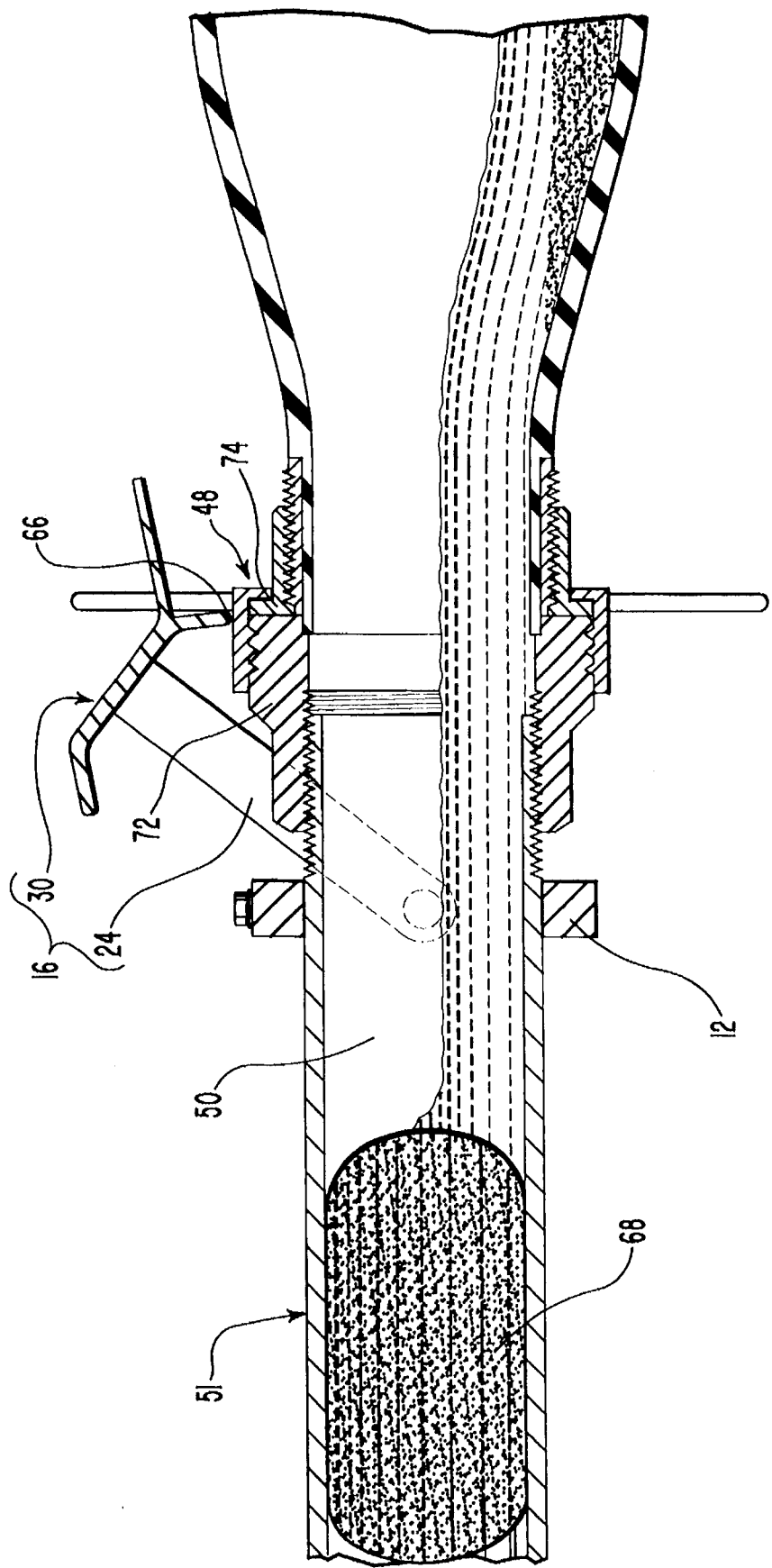
FIG. 4 is a longitudinal cross-sectional view of the embodiment depicted in FIG. 3 with the pipeline coupled, taken along lines 4—4 in FIG. 3 and illustrates a chemical or gelled pig passing within and/or through a pipeline.
Figure 5:
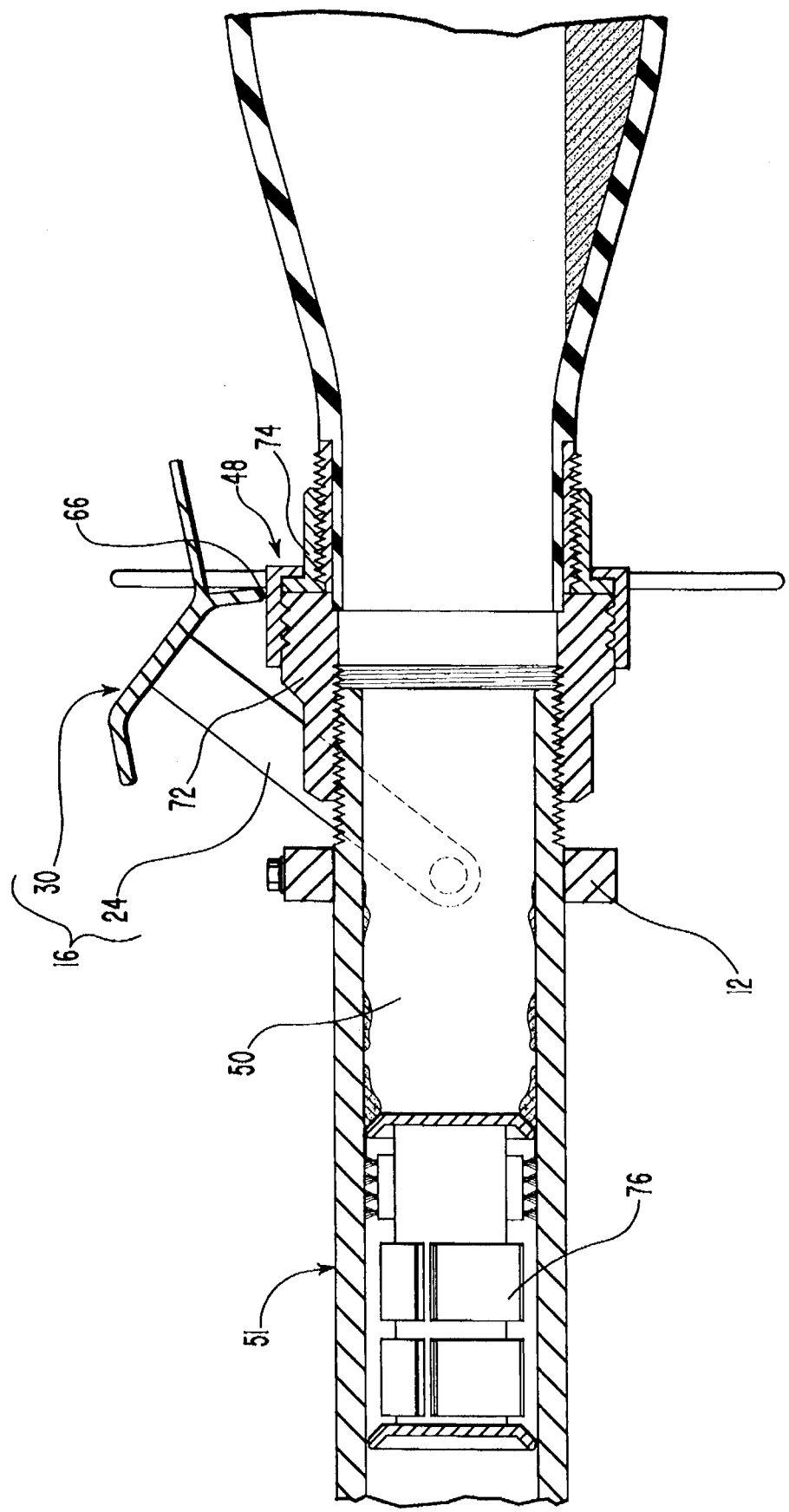
FIG. 5 is a longitudinal cross-sectional view of the embodiment depicted in FIG. 3 with the pipeline coupled, taken along lines 4—4 in FIG. 3 and illustrates a mechanical pig passing within and/or through a pipeline.

As seen in FIGS. 4 and 5, pigstop 16 imposes on a coupler, designated generally as reference numeral 48. As used herein the term "coupler" includes any manner in which two segments of pipe can be joined, i.e., connectors, fittings, unions, couplings, joints, cooperating threading or some other name of a device serving the function of joining two pipes. The term "coupler", as used herein, can also include the end of any length of pipe, since ultimately any end of pipe may be threaded and joined with a second pipe member threaded so as to cooperate with the threads of the first pipe member. Therefore, it is also contemplated herein that the term "coupling point" includes not only the point at which two lengths of pipe are joined by a coupler, but also the end of a pipe, if no joining is ultimately attempted or to intended.

Coupler 48 has a first end 72 and a second end 74, that join at coupling point 66. Pigstop 16 will automatically seek the position closest to horizontal since, as discussed above, pigstop 16 is precluded from resting in equilibrium at perfect vertical by rod 60. (See FIG. 2). As a chemical or gelled pig 68 (FIG. 4) or mechanical pig 76 (FIG. 5) passes through pipeline, referred to generally by the reference numeral 51, fluid or debris is separated and pushed within pipeline 51. At the appropriate moment, the force propelling chemical or gelled pig 68 or mechanical pig 76 is terminated, optimally allowing chemical or gelled pig 68 or mechanical pig 76 to safely exit pipeline 51. However, if there is error in the manner in which the propelling force is released from pipeline 51, the decoupling of coupler 48 will cause chemical or gelled pig 68 or mechanical pig 76 to seek a point without pipeline 51 and possibly be projected at coupling point 66.

Figure 6:
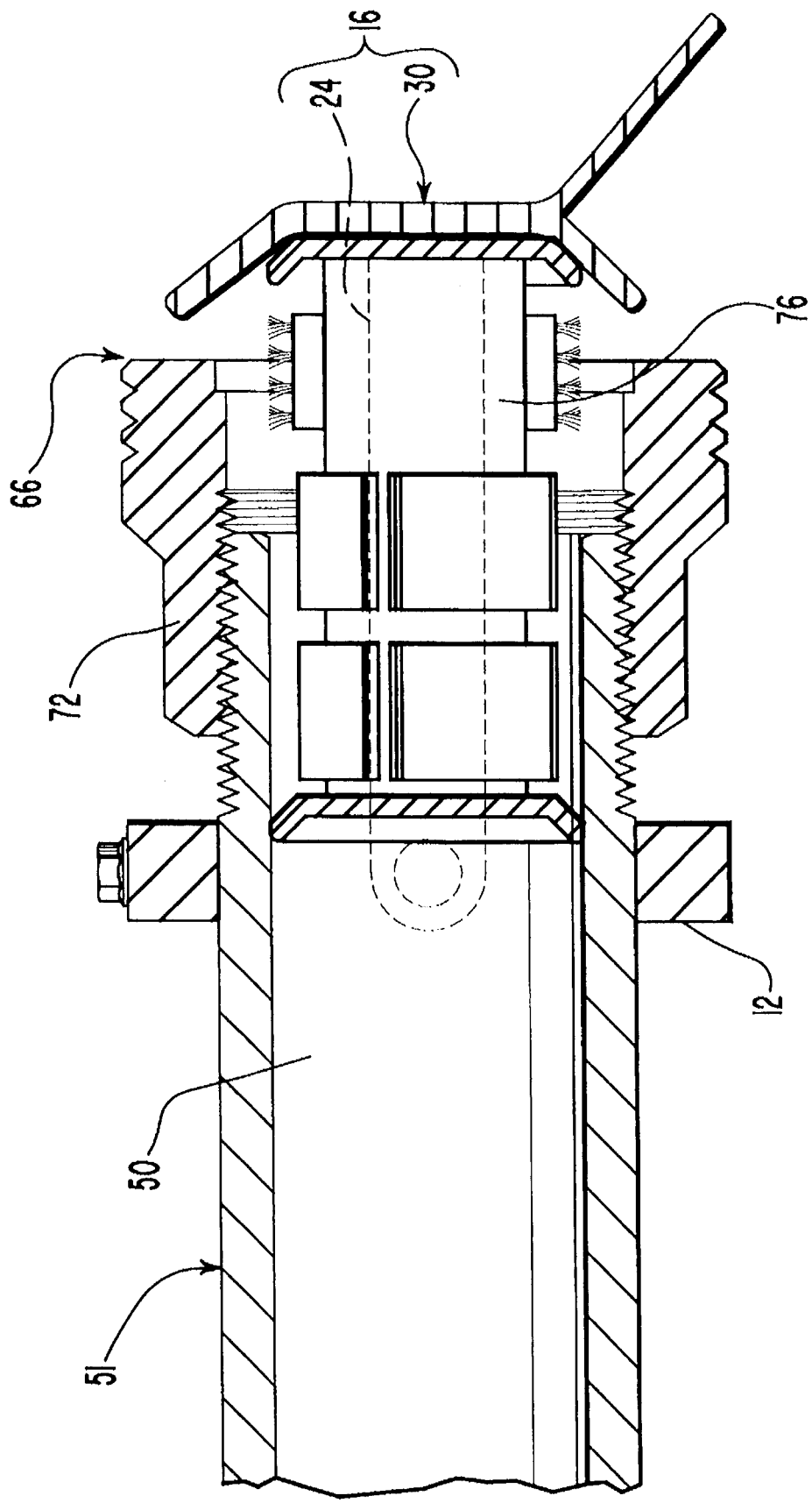
FIG. 6 is a longitudinal cross-sectional view of the embodiment depicted in FIG. 3, taken along lines 4—4 in FIG. 3 and illustrates such embodiment fully engaged and retaining a mechanical pig within the pipeline.

Nevertheless, upon separation of coupler 48 into first end 72 and second end 74, pigstop 16 will automatically seek a point substantially perpendicular or normal to the plane formed by base 12 before an injectile within pipeline 51 can be projected at coupling point 66. As shown in FIG. 6, the injectile's progress is automatically halted and is precluded from escaping pipeline 51 at coupling point 66.

Another alternative embodiment of the present invention (See FIGS. 7–8) contemplates an improvement over and above the invention set forth in Canadian Patent No. 1,303,094 issued Jun. 9, 1992 to Chapmen et al., the contents of which are incorporated herein by reference. The invention disclosed in Canadian Patent No. 1,303,094 can be broadly referred to as a pipe union assembly and generally designated in FIG. 8 as reference numeral 100. Such improvement, over and above the invention set forth in Canadian Patent No. 1,303,094, (See FIG. 7) further contemplates base 12, clamping arm 54 for clamping base 12 to pipe terminus 50 and pigstop 16 used in connection with pipe union assembly 100. Such alternative embodiment may further comprise flange 49 for situating base 12 on pipe terminus 50 such that base 12 is in the optimal position with respect to coupling point 66.

Pigstop 16 is provided to prevent an injectile from inadvertently escaping hollow fit member (depicted generally in FIG. 7 as reference numeral 78) at coupling point 66. Pigstop 16 automatically engages in rotatable motion when pipeline 51 is decoupled at coupling point 66.

For convenience and without limitation, pipe union assembly 100 (See FIG. 7) contemplates a hollow fitting member 78 having a first end 80 and a second end 82, means for attaching hollow fitting member at the first end 80 to the first pipe member 86, and an annular tapered ridge 88 extending from the second end 82 of the hollow fitting member 78. Pipe union assembly 100 further contemplates a hollow rigid sealing member 90 (See FIG. 8) having a first end 92 and a second end 94, and means for attaching hollow rigid sealing member 90 at first end 92 to second pipe member 96.

Figure 7:
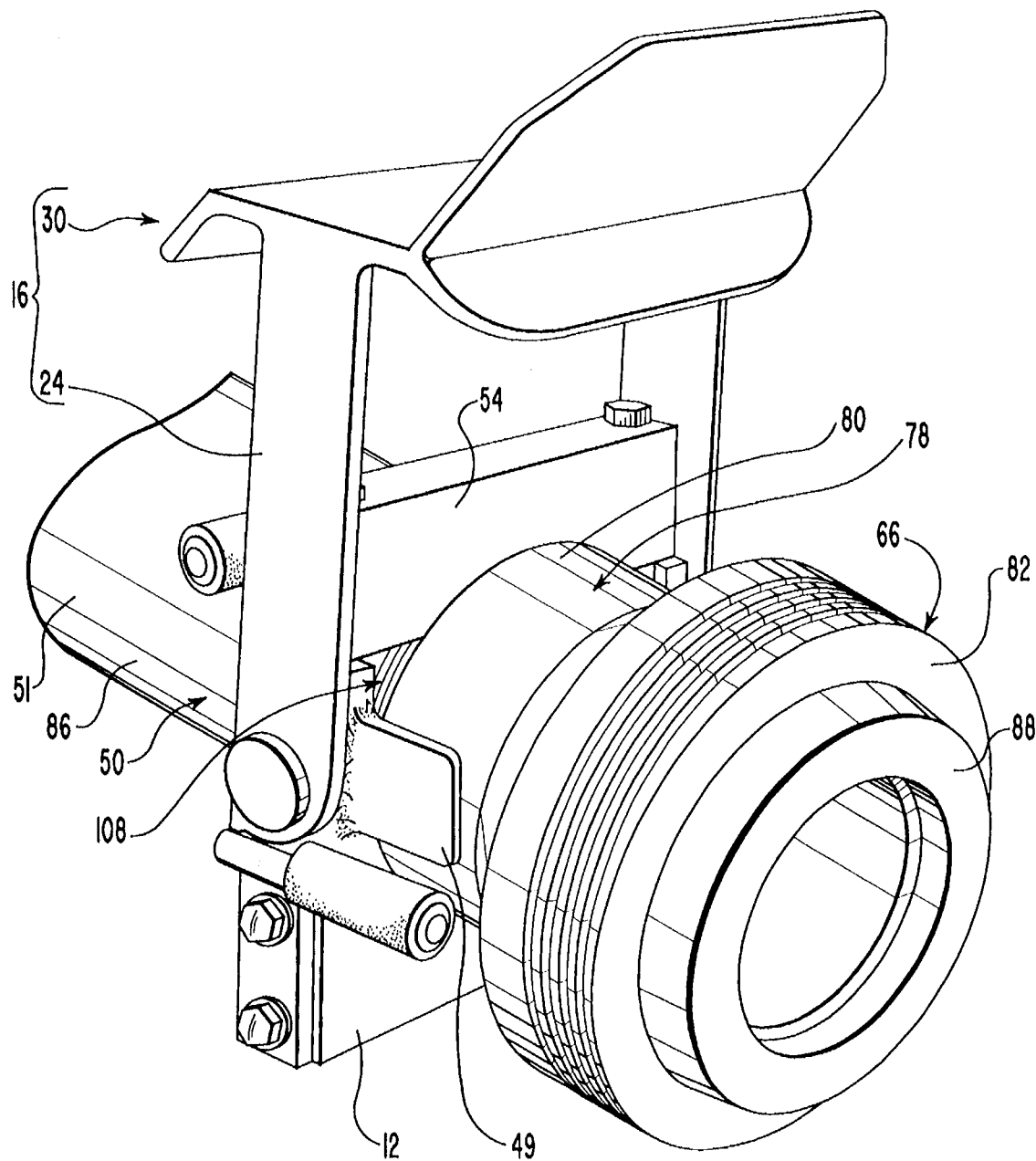
FIG. 7 is a perspective view of an alternative embodiment of the present invention with the pipe union assembly decoupled.
Figure 8:
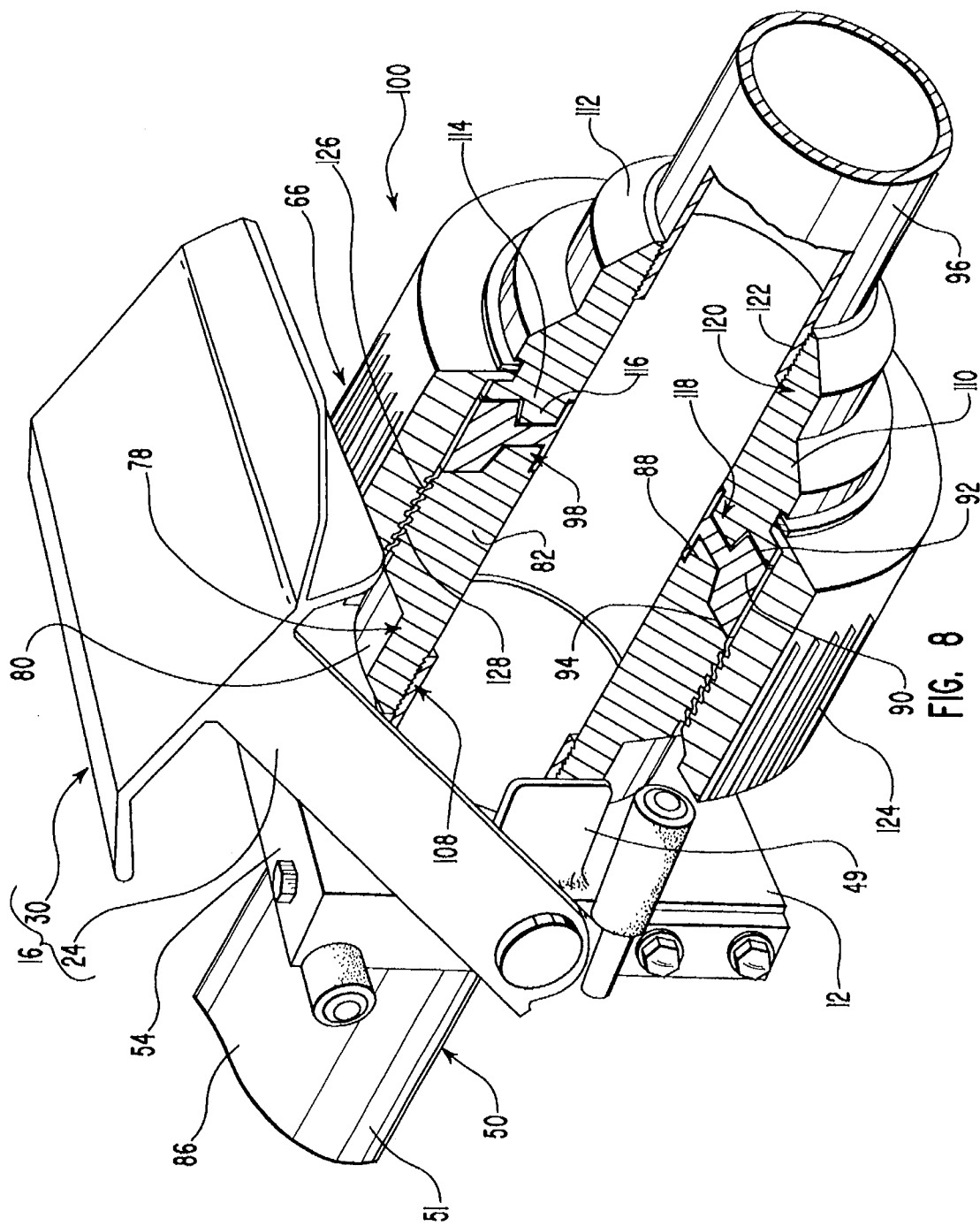
FIG. 8 is a cut away view of the embodiment depicted in FIG. 7 with the pipe union assembly coupled.

As shown in FIGS. 7 and 8, means for attaching hollow fitting member 78 at first end 80 to first pipe member 86, by way of example and not limitation, can comprise coordinating threading of female threaded portions on male threaded portions of first pipe member and/or second pipe member, designated generally as 108. Besides threading, other possible methods include high pressure acme threads, butt welding, or other methods well known in the art.

First pipe member 86 may be rigidly or even permanently joined to hollow fitting member 78 since the need to intermittently disassemble hollow fitting member 78 and/or hollow rigid sealing member 90 is avoided when using pipe union assembly 100. Thus, the connection between hollow fitting member 78 with first pipe member 86 may be made by welding to provide additional strength and further prevent leakage.

Whatever method is used to attach first pipe member 86 to hollow fitting member 78, the seal formed by the connection must have sufficient strength to ensure that the connection will not leak or deteriorate when used at the expected operating temperatures and pressures. In addition, the seal must also be resistant to any fluid passing within the pipeline (which in some cases may be corrosive).

An annular tapered channel designated generally in FIG. 8 as reference numeral 98 at the second end 94 of hollow rigid sealing member 90 is further provided to complement the shape of annular tapered ridge 88 and to sealing engage annular tapered ridge 88 of hollow fitting member 78 such that hollow sealing member 90 substantially retains its original configuration when annular tapered channel 98 receives annular tapered ridge 88.

By way of example and not limitation, means for attaching hollow rigid sealing member 90 at first end 92 to second pipe member 96 comprises second hollow fitting member 110 having a first end 112 and a second end 114. Means for attaching second hollow fitting member 110 to second pipe member 96 are also provided, which by way of example and not limitation, comprises coordinating threads 120 of second hollow fitting member 110 with threads 122 of second pipe member 96. All of the means for attaching hollow fitting member 78 to first pipe member 86, referred to above, are equally applicable for attaching second hollow fitting member 110 to second pipe member 96. An annular tapered ridge 116 extends from second end 114 of second hollow fitting member 110. First end 92 of hollow rigid sealing member 90 is further provided with annular tapered channel, designed generally as reference numeral 118, configured to compliment the shape of annular tapered ridge 116 of second hollow fitting member 110 such that hollow rigid sealing member 90 substantial retains its original configuration when annular tapered channel 118 receives annular tapered ridge 116. Sleeve 124 is further provided and is configured to be releasably or permanently secured to second hollow fitting member 110. Sleeve 124 is provided with threading 126 to cooperate with threading 128 at second end 82 of hollow fitting member 78. In this manner, sleeve 124 may be advanced toward hollow fitting member 78 and thereby secure hollow fitting member 78 with second hollow fitting member 110 and hollow sealing member 90 in sealing engagement. As shown in FIG. 8, sleeve 124 is generally cylindrical and has dimensions which allow its inner diameter to slip over the outer diameter of hollow fitting member 78 and second hollow fitting member 110. Preferably the fit between the inner diameter of sleeve 124 and outer diameter of hollow fitting member 78 and second hollow fitting member 110 is precise so as to add additional strength to pipe union assembly 100 by contacting the outer circumference of hollow rigid sealing member 90 and stabilizing its position. It should be appreciated that structures other than the structures shown in the figures may be devised and used to urge hollow rigid sealing member 90, hollow fitting member 78 and second hollow fitting member 110 into sealing engagement. An example of such structures are set forth in Canadian Patent No. 1,303,094 to Chapmen et al., which is incorporated herein by reference.

Figure 9:
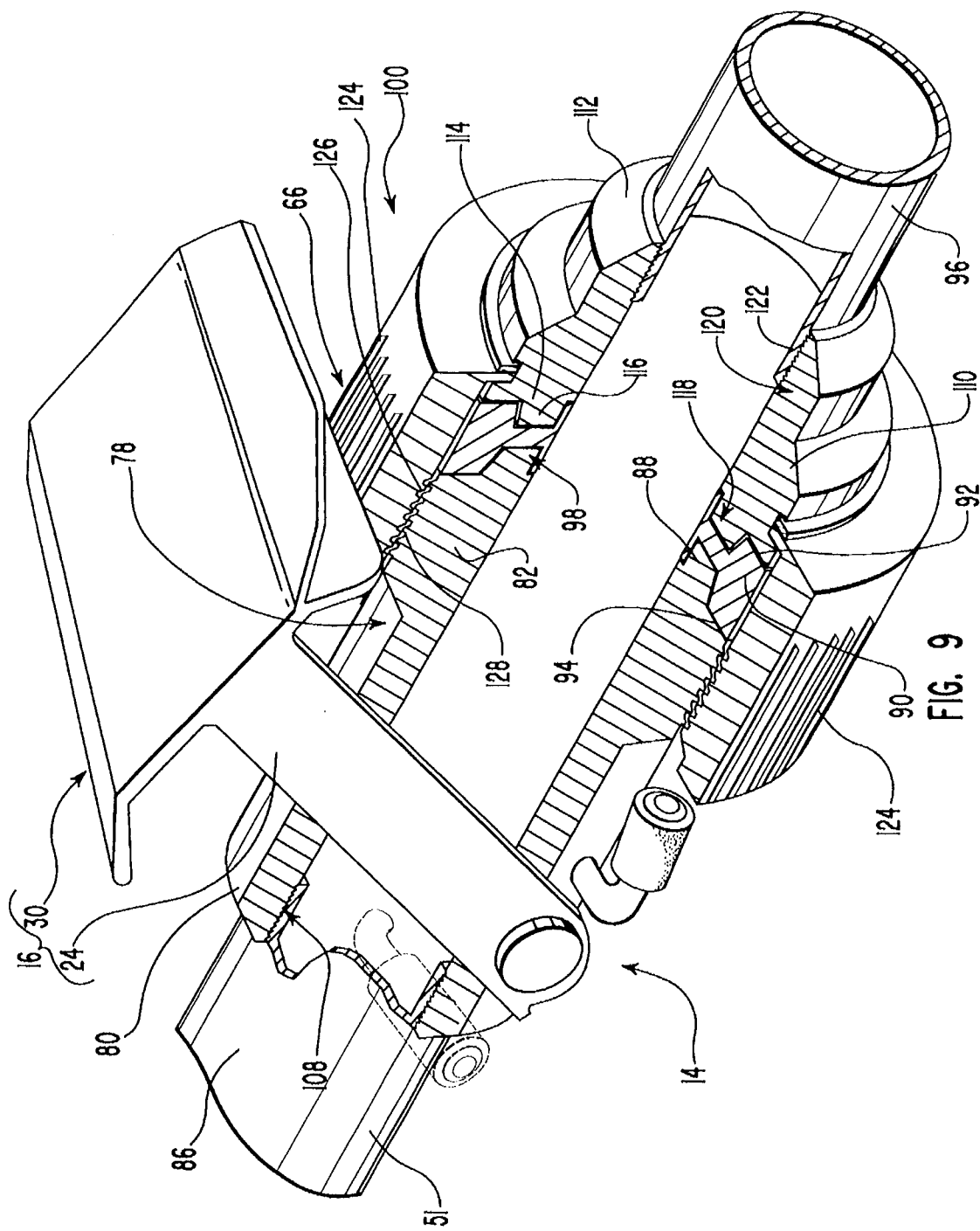
FIG. 9 is a cut away view of another alternative embodiment of the present invention with the pipe union assembly coupled.

In another alternative embodiment, the base is formed so as to be integral with first end 80 of hollow fitting member 78 and is designated generally as reference numeral 14. (See FIG. 9) As seen in FIG. 9, base 14 is formed to be not structurally distinct from first end 80 of hollow fitting member 78. It is also contemplated, however, that base 14 could be formed so as to be integral with first end 80, but also have structural distinctiveness. In this manner, base 14 could be formed not unlike base 12 in FIG. 8, but formed so as to be integral with first end 80 so that clamping arm 54 is not required. Structural distinctiveness is not required so long as pigstop 16 can be engaged without having its motion impeded.

Such alternative embodiment further contemplates hollow fitting member 78 having a second end 82, coordinating threads designated generally as reference numeral 108 for attaching hollow fitting member 78 at first end 80 to first pipe member 86, and an annular tapered ridge 88 extending from second end 82 of hollow fitting member 78. It is also provided that hollow rigid sealing member 90 having first end 92 and second end 94 and annular tapered channel designated generally as reference numeral 98 configured to complement the shape of annular tapered ridge 88 further comprises the present invention. Second end 94 of hollow rigid sealing member 90 is provided with annular tapered channel 98 that is also formed 13 to sealingly engage annular tapered ridge 88, such that hollow rigid sealing member 90 substantially retains its original configuration when annular tapered channel 98 receives annular tapered ridge 88. Means for attaching hollow rigid sealing member 90 at first end 92 to second pipe member 96 are further provided and may, by way of example and not limitation, include second hollow fitting member 110. Having a first end 112 and a second end 114 and threads 120 of second hollow fitting member 110 to cooperate with threads 122 of second pipe member 96. Annular tapered ridge 116 extends from second end 114 of second hollow fitting member 110 and first end 92 of hollow rigid sealing member 90 is further provided with annular tapered channel designated generally as reference numeral 118 configured to compliment the shape of annular tapered ridge 116 of second hollow fitting member 110, such that hollow rigid sealing member 90 substantially retains its original configuration when annular tapered channel 118 receives annular tapered ridge 116. As in the embodiment depicted in FIG. 8, sleeve 124 is further provided with threading 126 to cooperate with threading 128 at second end 82 of hollow fitting member 78. In this manner, sleeve 124 may be advanced toward hollow fitting member 78, thereby securing hollow fitting member 78 with second hollow fitting member 110 and hollow sealing member 90 in sealing engagement.

Pigstop 16 is further provided to prevent an injectile from inadvertently escaping hollow fitting member 78 at coupling point 66. It is contemplated that pigstop 16 automatically engages when pipeline 51 is decoupled at coupling point 66.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A safety device for use with a coupler which prevents an injectile propelled within a pipeline having a terminus from inadvertently escaping the pipeline at a coupling point, the safety device comprising:

a base positioned at a location near the coupling point;

means for clamping the base to the pipeline terminus; and means attached to said base for automatically halting the progress of the injectile to prevent the injectile from inadvertently escaping the pipeline at the coupling point, which means for automatically halting the progress of the injectile automatically engages when the pipeline is decoupled at the coupling point.

2. A safety device for use with a coupler which prevents an injectile propelled within a pipeline having a terminus from inadvertently escaping the pipeline at a coupling point as recited in claim 1, wherein the means for automatically halting the progress of the injectile comprises:

an arm having a first end and a second end, the arm being rotatably attached to the base at the first end; and a shield integral with and depending from the arm at the second end.

3. A safety device for use with a coupler which prevents an injectile propelled within a pipeline having a terminus from inadvertently escaping the pipeline at a coupling point as recited in claim 2, wherein the shield is substantially u-shaped.

4. A safety device for use with a coupler which prevents an injectile propelled within a pipeline having a terminus from inadvertently escaping the pipeline at a coupling point as recited in claim 1, wherein the means for clamping the base to the pipeline terminus comprises:

a clamping arm;

a bolt passing through the clamping arm; and a hole formed in the top of the base cooperating with the bolt.

5. A safety device for use with a coupler which prevents an injectile propelled within a pipeline having a terminus from inadvertently escaping the pipeline at a coupling point as recited in claim 4, wherein the clamping arm is formed so as to conform to the external shape of the pipeline terminus.

6. A safety device for use with a coupler which prevents an injectile propelled within a pipeline having a terminus from inadvertently escaping the pipeline at a coupling point as recited in claim 1, wherein the base is formed so as to conform to the external shape of the pipeline terminus.

7. A safety device for use with a coupler which prevents an injectile propelled within a pipeline having a terminus from inadvertently escaping the pipeline at a coupling point recited in claim 1, wherein the safety device further comprises means for displacing the means for automatically halting the progress of the injectile.

8. A safety device for use with a coupler which prevents an injectile propelled within a pipeline having a terminus from inadvertently escaping the pipeline at a coupling point as recited in claim 7, wherein the means for displacing the means for automatically halting the progress of the injectile comprises a flange depending from and integral with the means for automatically halting the progress of the injectile.

9. A safety device for use with a coupler which prevents an injectile propelled within a pipeline having a terminus from inadvertently escaping the pipeline at a coupling point as recited in claim 1, wherein the safety device further comprises means for horizontally positioning the means for automatically halting the progress of the injectile such that the means for automatically halting the progress of the injectile is substantially perpendicular to the base.

10. A safety device for use with a coupler which prevents an injectile propelled within a pipeline having a terminus from inadvertently escaping the pipeline at a coupling point as recited in claim 1, wherein the safety device further comprises means for vertically positioning the means for automatically halting the progress of the injectile such that the means for automatically halting the progress of the injectile is precluded from obtaining a perfect vertical position.

11. A safety device for use with a coupler which prevents an injectile propelled within a pipeline having a terminus from inadvertently escaping the pipeline at a coupling point as recited in claim 1, wherein the safety device further comprises means for situating the base on the pipeline terminus such that the base is in the optimal position with respect to the coupling point.

12. A safety device for use with a coupler which prevents an injectile propelled within a pipeline having a terminus from inadvertently escaping the pipeline at a coupling point as recited in claim 11, wherein the means for situating the base on the pipeline terminus such that the base is in the optimal position with respect to the coupling point comprises a flange integral with the base and extending substantially normal to the plane thereof.

13. A safety device for use with a coupler which prevents an injectile propelled within a pipeline having a terminus from inadvertently escaping the pipeline at a coupling point, the safety device comprising:

a hollow fitting member having a first end and a second end;

means for attaching the hollow fitting member at the first end thereof to a first pipe member;

an annular tapered ridge extending from the second end of the hollow fitting member;

a hollow rigid sealing member having a first end and a second end, the hollow rigid sealing member comprising an annular tapered channel at the second end thereof, the channel being configured to complement the shape of the annular tapered ridge and to sealingly engage the annular tapered ridge of the hollow fitting member such that the hollow rigid sealing member substantially retains its original configuration when the annular tapered channel receives the annular tapered ridge;

means for attaching the hollow rigid sealing member at the first end thereof to a second pipe member;

a base positioned at a location near the coupling point;

means for clamping the base to the pipeline terminus; and means attached to said base for automatically halting the progress of the injectile to prevent the injectile from inadvertently escaping the hollow fitting member at the coupling point, which means for automatically halting the progress of the injectile automatically engages when the pipeline is decoupled at the coupling point.

14. A safety device for use with a coupler which prevents an injectile propelled within a pipeline having a terminus from inadvertently escaping the pipeline at a coupling point as recited in claim 13, wherein the means for automatically halting the progress of the injectile comprises:

an arm having a first end and a second end, the arm being rotatably attached to the base at the first end; and a shield integral with and depending from the arm at the second end.

15. A safety device for use with a coupler which prevents an injectile propelled within a pipeline having a terminus from inadvertently escaping the pipeline at a coupling point as recited in claim 14, wherein the shield is substantially u-shaped.

16. A safety device for use with a coupler which prevents an injectile propelled within a pipeline having a terminus from inadvertently escaping the pipeline at a coupling point as recited in claim 13, wherein the means for clamping the base to the first end of the pipeline terminus comprises:

a clamping arm;

at least one bolt passing through the clamping arm; and a hole formed in the top of the base cooperating with the bolt.

17. A safety device for use with a coupler which prevents an injectile propelled within a pipeline having a terminus from inadvertently escaping the pipeline at a coupling point as recited in claim 16, wherein the clamping arm is formed so as to conform to the external shape of the pipeline terminus.

18. A safety device for use with a coupler which prevents an injectile propelled within a pipeline having a terminus from inadvertently escaping the pipeline at a coupling point as recited in claim 13, wherein the base is formed so as to conform to the external shape of the pipeline terminus.

19. A safety device for use with a coupler which prevents an injectile propelled within a pipeline having a terminus from inadvertently escaping the pipeline at a coupling point as recited in claim 13, wherein the safety device further comprises means for displacing the means for automatically halting the progress of the injectile.

20. A safety device for use with a coupler which prevents an injectile propelled within a pipeline having a terminus from inadvertently escaping the pipeline at a coupling point as recited in claim 19, wherein the means for displacing the means for automatically halting the progress of the injectile comprises a flange depending from and integral with the means for automatically halting the progress of the injectile.

21. A safety device for use with a coupler which prevents an injectile propelled within a pipeline having a terminus from inadvertently escaping the pipeline at a coupling point as recited in claim 13, wherein the safety device further comprises means for horizontally positioning the means for automatically halting the progress of the injectile such that the means for automatically halting the progress of the injectile is substantially perpendicular to the base.

22. A safety device for use with a coupler which prevents an injectile propelled within a pipeline having a terminus from inadvertently escaping the pipeline at a coupling point as recited in claim 15, wherein the safety device further comprises means for vertically positioning the means for automatically halting the progress of the injectile such that the means for automatically halting the progress of the injectile is precluded from obtaining a perfect vertical position.

23. A safety device for use with a coupler which prevents an injectile propelled within a pipeline having a terminus from inadvertently escaping the pipeline at a coupling point as recited in claim 13, wherein the safety device further comprises means for situating the base on the pipeline terminus such that the base is in the optimal position with respect to the coupling point.

24. A safety device for use with a coupler which prevents an injectile propelled within a pipeline having a terminus from inadvertently escaping the pipeline at a coupling point as recited in claim 23, wherein the means for situating the base on the first end of the pipeline terminus such that the base is in the optimal position with respect to the coupling point comprises a flange integral with the base and extending substantially normal to the plane thereof.

25. A safety device for use with a coupler which prevents an injectile propelled within a pipeline having a terminus from inadvertently escaping the pipeline at a coupling point, the safety device comprising:

a hollow fitting member having a first end and a second end;

means for attaching the hollow fitting member at the first end thereof to a first pipe member;

an annular tapered ridge extending from the second end of the hollow fitting member;

a hollow rigid sealing member having a first end and a second end, the hollow rigid sealing member comprising an annular tapered channel at the second end thereof, the channel being configured to complement the shape of the annular tapered ridge and to sealingly engage the annular tapered ridge of the hollow fitting member such that the hollow rigid sealing member substantially retains its original configuration when the annular tapered channel receives the annular tapered ridge;

means for attaching the hollow rigid sealing member at the first end thereof to a second pipe member;

a base integral with the first end of the hollow fitting member positioned at a location near the coupling point; and means attached to said base for automatically halting the progress of the injectile to prevent the injectile from inadvertently escaping the hollow fitting member at the coupling point, which means for automatically halting the progress of the injectile automatically engages when the pipeline is decoupled at the coupling point.

26. A safety device for use with a coupler which prevents an injectile propelled within a pipeline having a terminus from inadvertently escaping the pipeline at a coupling point as recited in claim 25, wherein the means for automatically halting the progress of the injectile from inadvertently escaping the pipeline at the coupling point comprises:

an arm having a first end and a second end, the arm being rotatably attached to the base at the first end; and a shield integral with and depending from the arm at the second end.

27. A safety device for use with a coupler which prevents an injectile propelled within a pipeline having a terminus from inadvertently escaping the pipeline at a coupling point as recited in claim 26, wherein the shield is substantially u-shaped.

28. A safety device for use with a coupler which prevents an injectile propelled within a pipeline having a terminus from inadvertently escaping the pipeline at a coupling point as recited in claim 25, wherein the safety device further comprises means for displacing the means for automatically halting the progress of the injectile.

29. A safety device for use with a coupler which prevents an injectile propelled within a pipeline having a terminus from inadvertently escaping the pipeline at a coupling point as recited in claim 28, wherein the means for displacing the means for automatically halting the progress of the injectile comprises a flange depending from and integral with the means for automatically halting the progress of the injectile.

30. A safety device for use with a coupler which prevents an injectile propelled within a pipeline having a terminus from inadvertently escaping the pipeline at a coupling point as recited in claim 25, wherein the safety device further comprises means for horizontally positioning the means for automatically halting the progress of the injectile such that the means for automatically halting the progress of the injectile is substantially perpendicular to the base.

31. A safety device for use with a coupler which prevents an injectile propelled within a pipeline having a terminus from inadvertently escaping the pipeline at a coupling point as recited in claim 25, wherein the safety device further comprises means for vertically positioning the means for automatically halting the progress of the injectile such that the means for automatically halting the progress of the injectile is precluded from obtaining a perfect vertical position.

* * * * *